(12) United States Patent
Chang et al.

(10) Patent No.: US 9,459,665 B2
(45) Date of Patent: Oct. 4, 2016

(54) ELECTRONIC DEVICE HAVING A SLIDE MECHANISM

(71) Applicant: Quanta Computer Inc., Kuei Shan Hsiang, Tao Yuan Shien (TW)

(72) Inventors: Jung-Wen Chang, Tao Yuan Shien (TW); Pao-Hsien Chang, Tao Yuan Shien (TW); Tsung-Hsueh Wu, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 117 days.

(21) Appl. No.: 14/227,153

(22) Filed: Mar. 27, 2014

(65) Prior Publication Data
US 2015/0192965 A1    Jul. 9, 2015

(30) Foreign Application Priority Data

Jan. 8, 2014  (TW) .............................. 103100609 A

(51) Int. Cl.
*G06F 1/16* (2006.01)
*A47B 97/08* (2006.01)
*A47B 23/04* (2006.01)

(52) U.S. Cl.
CPC ........... *G06F 1/1681* (2013.01); *A47B 23/042* (2013.01); *A47B 97/08* (2013.01); *G06F 1/166* (2013.01); *G06F 1/1626* (2013.01)

(58) Field of Classification Search
CPC .. A47B 97/08; A47B 23/042; A47B 23/043; G06F 3/02; G06F 3/0202; G06F 1/1618; G05B 11/01; A47G 1/143; H01H 2201/036; H01H 2205/006; H01H 2211/006
USPC ............. 248/454–456, 463, 206.5, 458, 444, 248/447, 688; 361/679.12, 679.09, 679.06, 361/679.08; 403/92–97; 16/334, 335, 321
See application file for complete search history.

(56) References Cited

U.S. PATENT DOCUMENTS

| | | | | |
|---|---|---|---|---|
| 8,267,368 | B2 * | 9/2012 | Torii ...................... | F16M 13/00 248/188.8 |
| 8,540,205 | B2 * | 9/2013 | Zhang .................... | F16M 11/10 248/686 |
| 9,116,550 | B2 * | 8/2015 | Siddiqui ............... | G06F 1/1618 |
| 2010/0264282 | A1 * | 10/2010 | Burklin ................. | F16C 11/106 248/124.2 |
| 2012/0175487 | A1 * | 7/2012 | Goto ........................ | G10G 7/00 248/447 |
| 2013/0229100 | A1 * | 9/2013 | Siddiqui ............... | G06F 1/1618 312/326 |
| 2014/0293534 | A1 * | 10/2014 | Siddiqui .................. | E05D 7/00 361/679.55 |

* cited by examiner

*Primary Examiner* — Nkeisha Smith
(74) *Attorney, Agent, or Firm* — McClure, Qualey & Rodack, LLP

(57) ABSTRACT

An electronic device is provided, including a housing, a circuit board, a fixed member, a curved groove formed on the fixed member, a slider, and a supporting member. The circuit board is disposed in the housing. The fixed member is fixed to the housing. The slider is movably disposed in the groove, and the supporting member is connected to the slider. When the slider moves from a first position to a second position in the groove, the slider protrudes from the housing for supporting the housing, and an angle is formed between the supporting member and the housing.

6 Claims, 10 Drawing Sheets

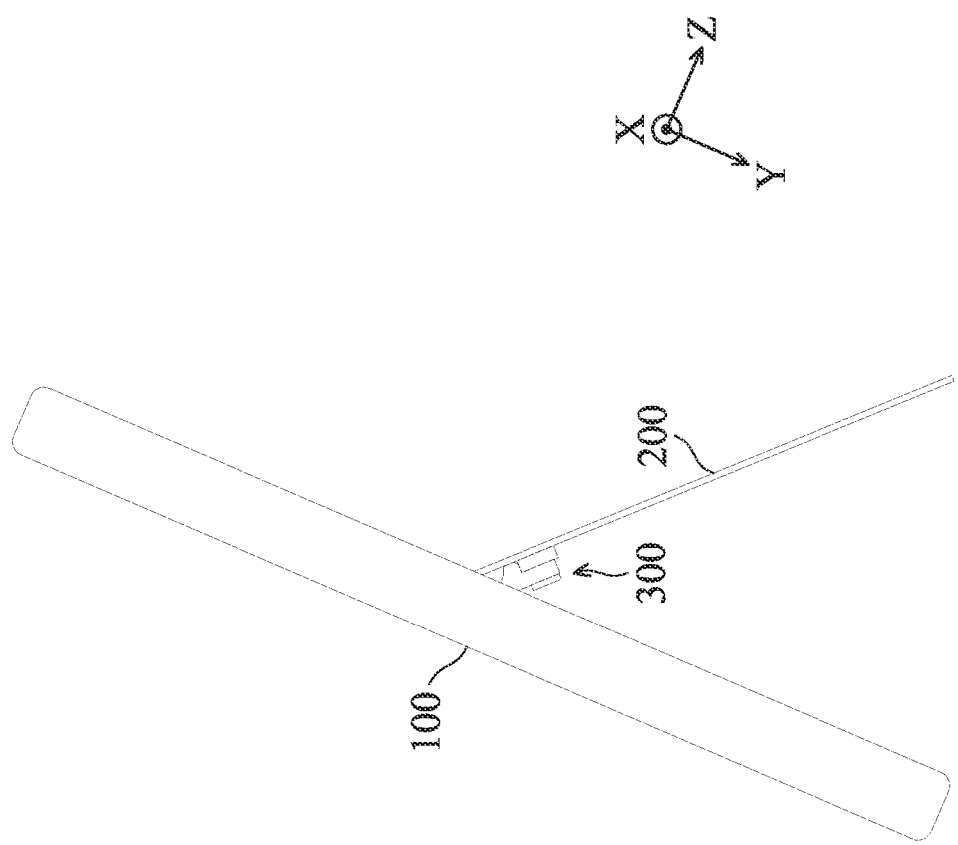

ELECTRONIC DEVICE HAVING A SLIDE MECHANISM

CROSS REFERENCE TO RELATED APPLICATIONS

The present application is based on, and claims priority from, Taiwan Patent Application No. 103100609, filed on Jan. 8, 2014, the disclosure of which is hereby incorporated by reference herein in its entirety.

BACKGROUND OF THE INVENTION

1. Field of the Invention

The application relates in general to an electronic device, and in particular, to an electronic device with a slide mechanism.

2. Description of the Related Art

In recent years, the structure of electronic products has become smaller and lighter. Thus, the thickness of those electronic products is thinner than before. However, conventional electronic products usually comprise hinge mechanisms, such as the hinge on a laptop computer which connects the display with the keyboard, and the hinge on a tablet computer which connects the main body with the supporter. As those hinges have a considerable thickness, they are not easily hidden in the small and light electronic products.

BRIEF SUMMARY OF INVENTION

To address the deficiency of conventional electronic products, an embodiment of the invention provides an electronic device, comprising a housing, a circuit board, a fixed member, a curved groove formed on the fixed member, a slider, and a supporting member. The circuit board is disposed in the housing. The fixed member is fixed to the housing. The slider is movably disposed in the groove, and the supporting member is connected to the slider. When the slider moves from a first position to a second position in the groove, the slider protrudes from the housing for supporting the housing, and an angle is formed between the supporting member and the housing.

In some embodiments, the slider includes a first recessed surface, a second recessed surface, and the first protrusion therebetween.

In some embodiments, the slider comprises a second protrusion, and a fixed member comprises a stopping portion. When the slider moves from a first position to a second position, the second protrusion contacts the stopping portion, and the slider is restricted in the second position.

In some embodiments, when the slider is in the first position, the supporting member is aligned with an outer surface of the housing.

In some embodiments, the fixed member and the housing are integrally formed in one piece by molding.

In some embodiments, the electronic device is a tablet computer.

In some embodiments, the electronic device further comprises an elastic member disposed on a side of the groove and including a protruding portion. When the slider is in the first position, the first recessed surface contacts the first protruding portion. When the slider is in the second position, the second recessed surface contacts the first protruding portion.

In some embodiments, the electronic device further comprises an elastic member and an elastic ball. The elastic member is disposed on a side of the groove, and the elastic ball contacts the elastic member. When the slider is in the first position, the first recessed surface contacts the elastic ball. When the slider is in the second position, the second recessed surface contacts the elastic ball.

In some embodiments, the elastic member comprises a recess with the elastic ball accommodated therein.

In some embodiments, the fixed member comprises a depression with the elastic ball accommodated therein.

BRIEF DESCRIPTION OF DRAWINGS

The invention can be more fully understood by reading the subsequent detailed description and examples with references made to the accompanying drawings, wherein:

FIG. 1A is a schematic diagram of an electronic device according to an embodiment of the invention;

DETAILED DESCRIPTION OF INVENTION

Figure 1B:
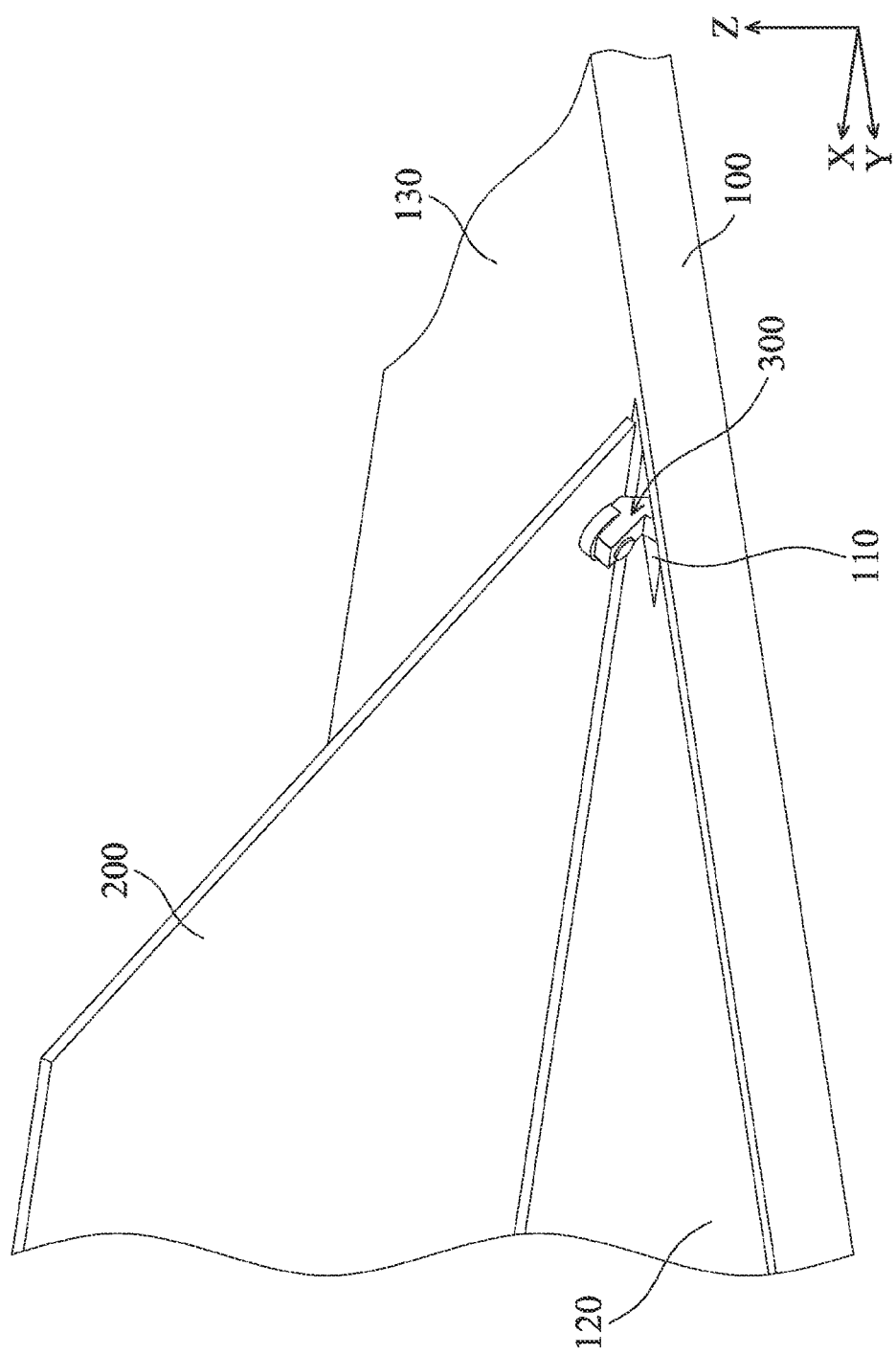
FIG. 1B is a partial schematic diagram of the electronic device in FIG. 1A according to an embodiment of the invention.

Referring to FIGS. 1A and 1B, FIG. 1A is a schematic diagram of an electronic device according to an embodiment of the invention, and FIG. 1B is a partial schematic diagram of the electronic device. The electronic device could be a tablet computer, comprising a housing 100, a supporting member 200, and a slide mechanism 300. As shown in FIG. 1A, the supporting member 200 protrudes from a side of the housing 100 for supporting the housing 100, such that the users can conveniently watch a display on the other side of the housing 100. Furthermore, an electronic element (not shown) such as a circuit board or a display module is disposed in the housing 100. As shown in FIG. 1B, the slide mechanism 300 connects to the supporting member 200 and is movably disposed in a hole 110 of the housing 100. Thus, the supporting member 200 can rotate relative to the housing 100. Additionally, a receiving portion 120 is also formed on the housing 100 for accommodating the supporting member 200.

Figure 2:
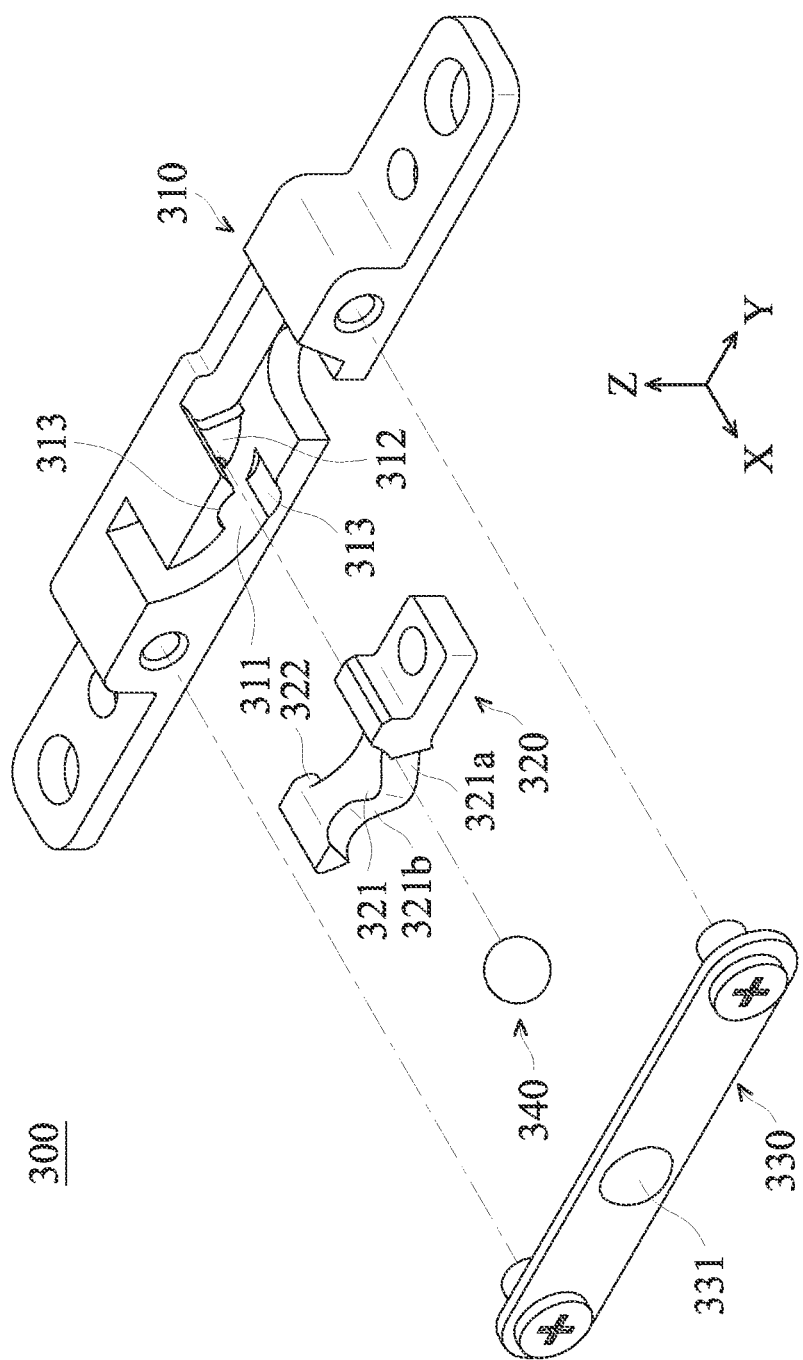
FIG. 2 is an exploded diagram of a slide mechanism according to an embodiment of the invention.
Figure 3A:
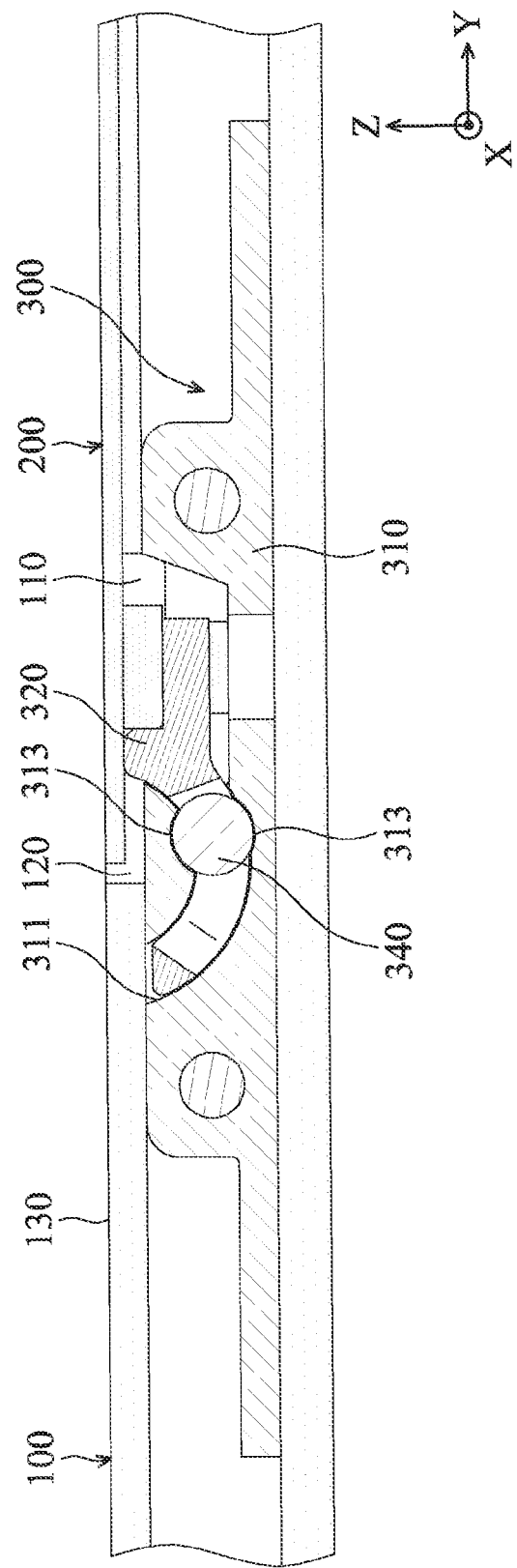
FIGS. 3A and 3B are cross-sectional views of an electronic device when the slider is in a first position according to an embodiment of the invention.
Figure 3B:
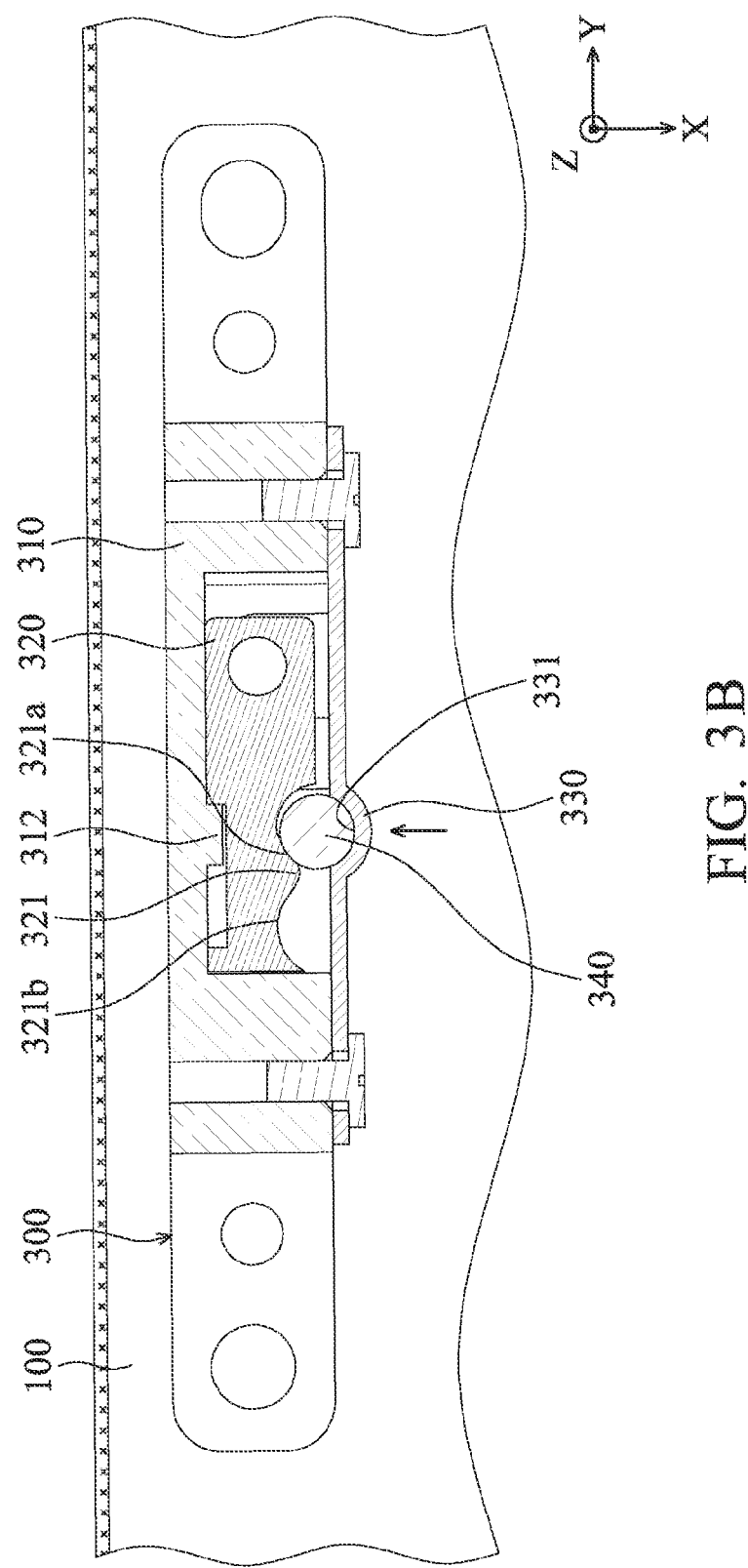

FIG. 2 is an exploded diagram of the slide mechanism 300. The slide mechanism 300 includes a fixed member 310, a slider 320, an elastic member 330, and an elastic ball 340. The fixed member 310 is fixed to the housing 100. A curved groove 311, a stopping portion 312, and two recesses 313 are formed on the fixed member 310, wherein the stopping portion 312 and the recesses 313 are situated in the groove 311. The elastic member 330 connects to the fixed member 310 and is disposed on a side of the groove 311. A depression 331 is formed on the elastic member 330, and the elastic ball 340 is accommodated in the depression 331 and the recess 313 (as shown in FIGS. 3A and 3B). The slider 320 is fixed to the supporting member 200 and movably disposed in the groove 311. The slider 320 includes a first protrusion 321, a second protrusion 322, a first recessed surface 321a, and a second recessed surface 321b. The first protrusion 321 is disposed between the first recessed surface 321a and the second recessed surface 321b. The second protrusion 322 corresponds to the stopping portion 312.

Referring to FIGS. 3A and 3B, FIGS. 3A and 3B respectively show a side cross-sectional view and a top cross-sectional view of the electronic device when the slider 320 is in a first position according to an embodiment of the invention. After assembly of the slide mechanism 300, the opposite sides of the elastic ball 340 respectively abut the elastic member 330 and the first recessed surface 321a on the right side of the first protrusion 321. As the elastic member 330 provides an elastic force to the elastic ball 340 (as the arrow indicates in FIG. 3B), the slider 320 can be fixed in a first position of the groove 311. Thus, the supporting member 200 connected to the slider 320 can also be positioned relative to the housing 100. As shown in FIG. 3A, when the supporting member 200 is positioned and accommodated in the receiving portion 120, the supporting member 200 is aligned with an outer surface 130 of the housing 100, such that the electronic device can achieve an integrated appearance.

Figure 4A:
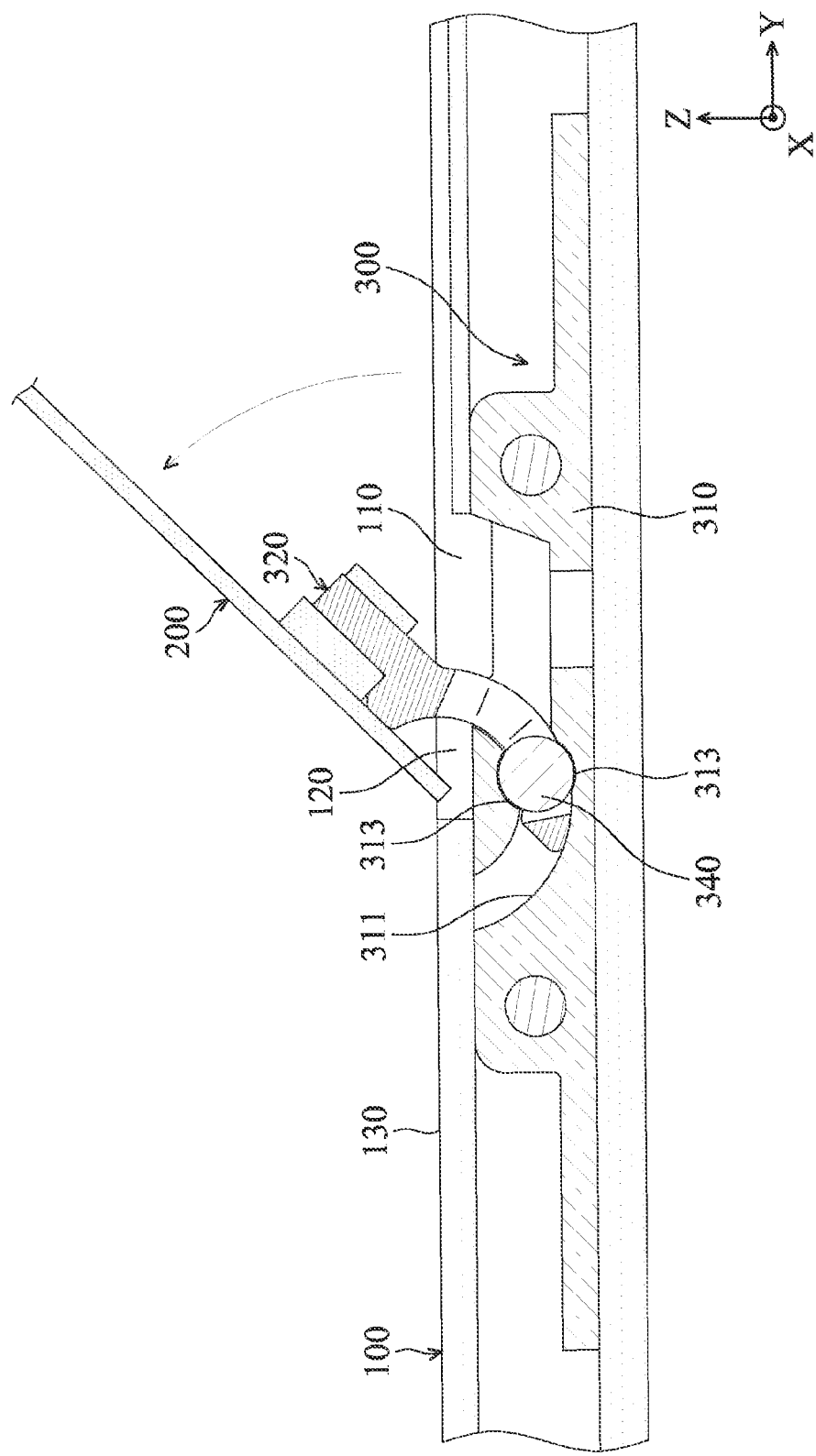
FIGS. 4A and 4B are cross-sectional views of an electronic device when the slider is in a second position according to an embodiment of the invention.
Figure 4B:
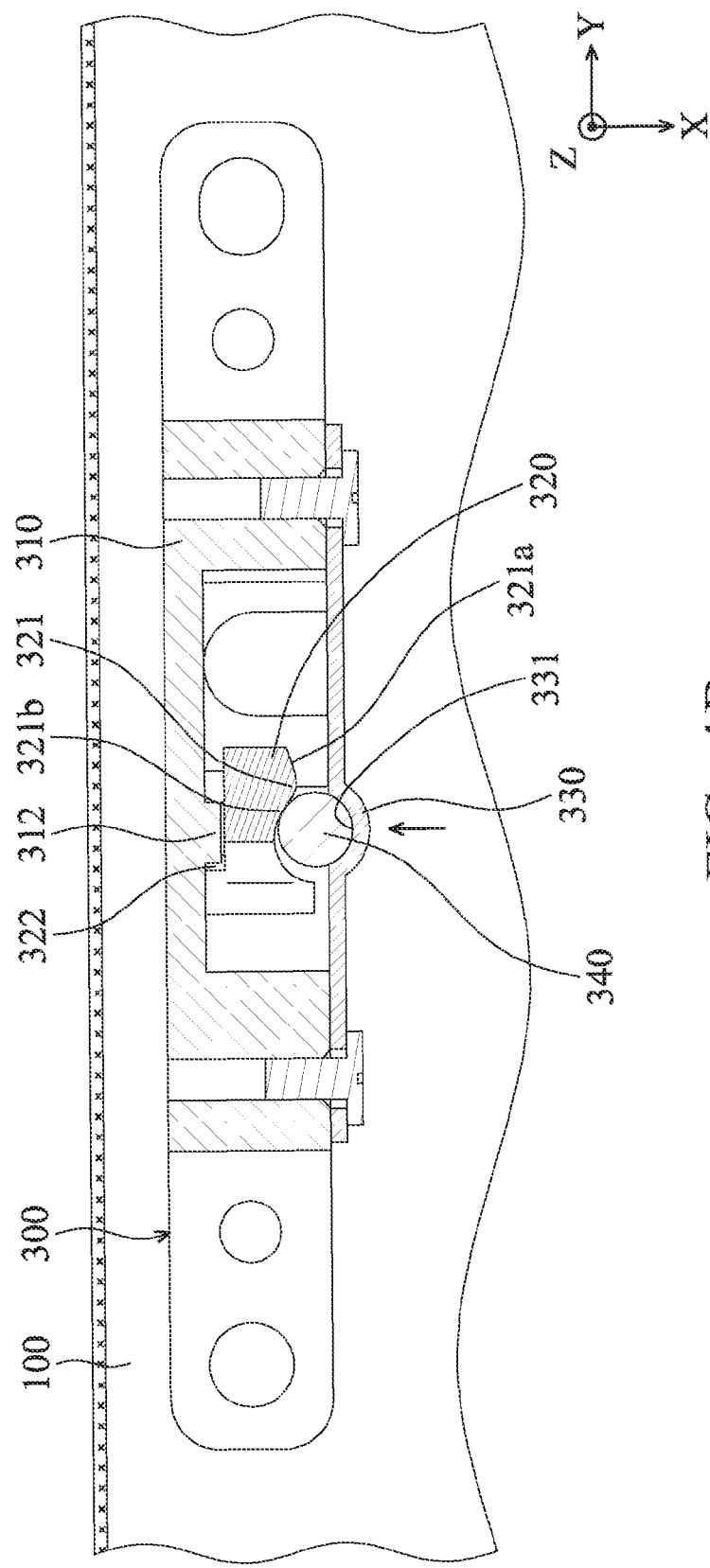

Referring to FIGS. 4A and 4B, when the supporting member 200 rotates along the direction indicated by the arrow in FIG. 4A relative to the housing 100 for supporting the housing 100, an angle is formed between the supporting member 200 and the housing 100. Thus, the elastic ball 340 moves from the first recessed surface 321a to the second recessed surface 321b, and the slider 320 moves from the first position (FIG. 3A) to a second position (FIG. 4A) and protrudes from the housing 100. As shown in FIG. 4B, when the slider 320 is in the second position, opposite sides of the elastic ball 340 respectively abut the elastic member 330 and the second recessed surface 321b on the left side of the first protrusion 321. In this state, the elastic member 330 still provides an elastic force (as the arrow indicates in FIG. 4B) to the elastic ball 340. Thus, the slider 320 can be positioned in the second position, and the supporting member 200 connected to the slider 320 can be also positioned at the aforesaid angle relative to the housing 100.

It is noted that, when the slider 320 moves from the first position to the second position (FIG. 4B), the second protrusion 322 contacts the stopping portion 312. Therefore, the slider 320 can be prevented from sliding out of the groove 311. In this embodiment, the elastic member 330 can be a metal sheet, and the elastic ball 340 may comprise rubber.

Figure 5A:
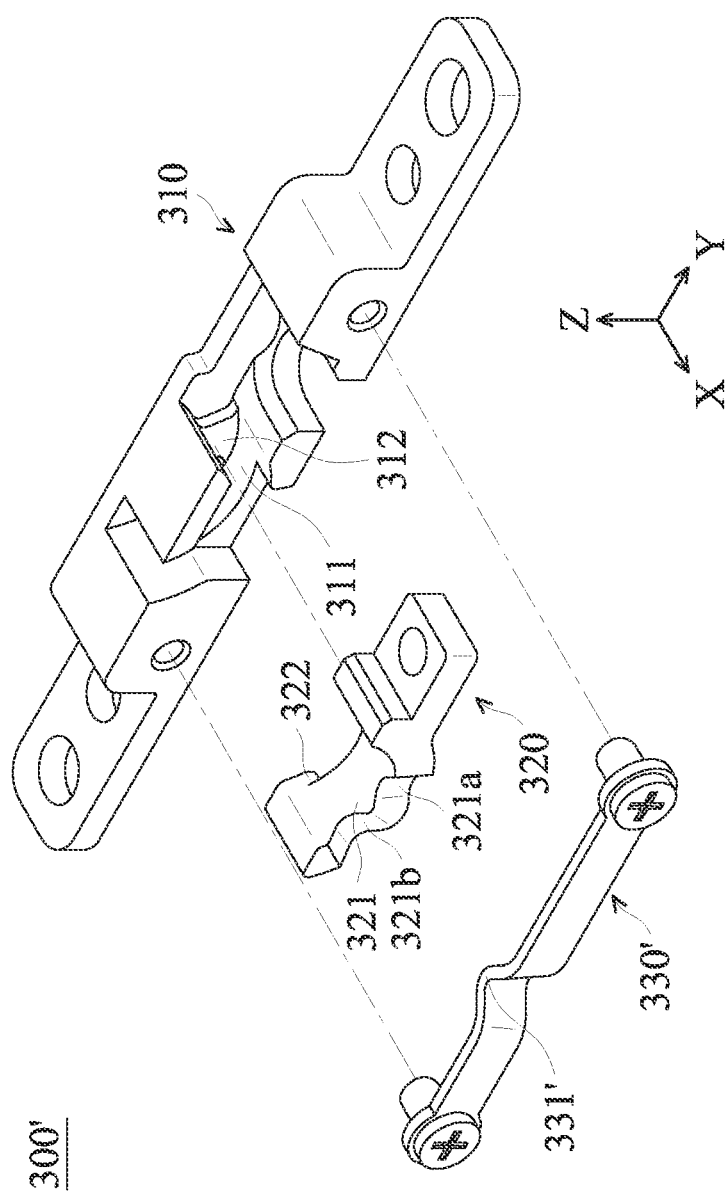
FIG. 5A is an exploded diagram of a slide mechanism according to an embodiment of the invention.
Figure 5B:
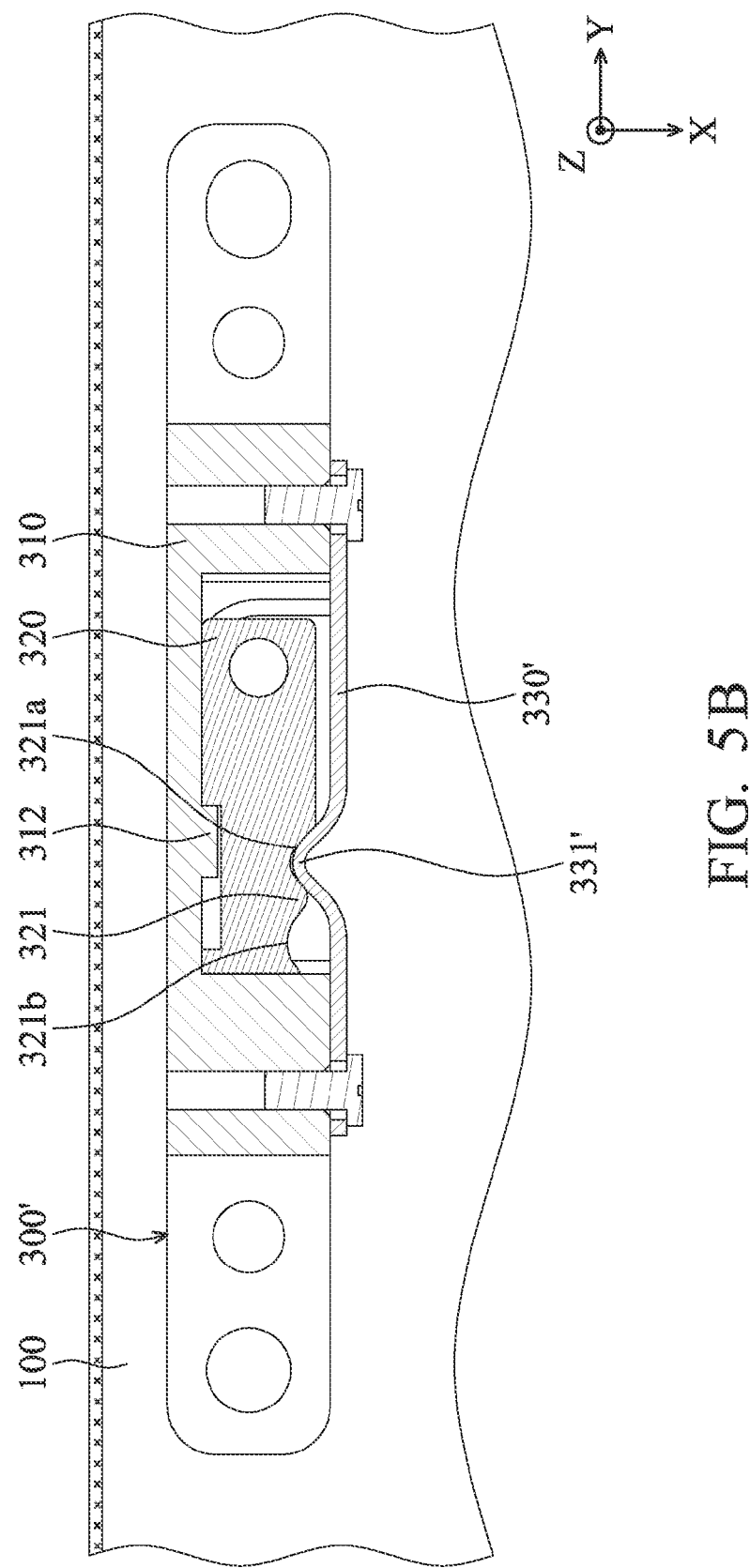
FIG. 5B is a cross-sectional view of an electronic device when the slider is in a first position according to an embodiment of the invention.
Figure 5C:
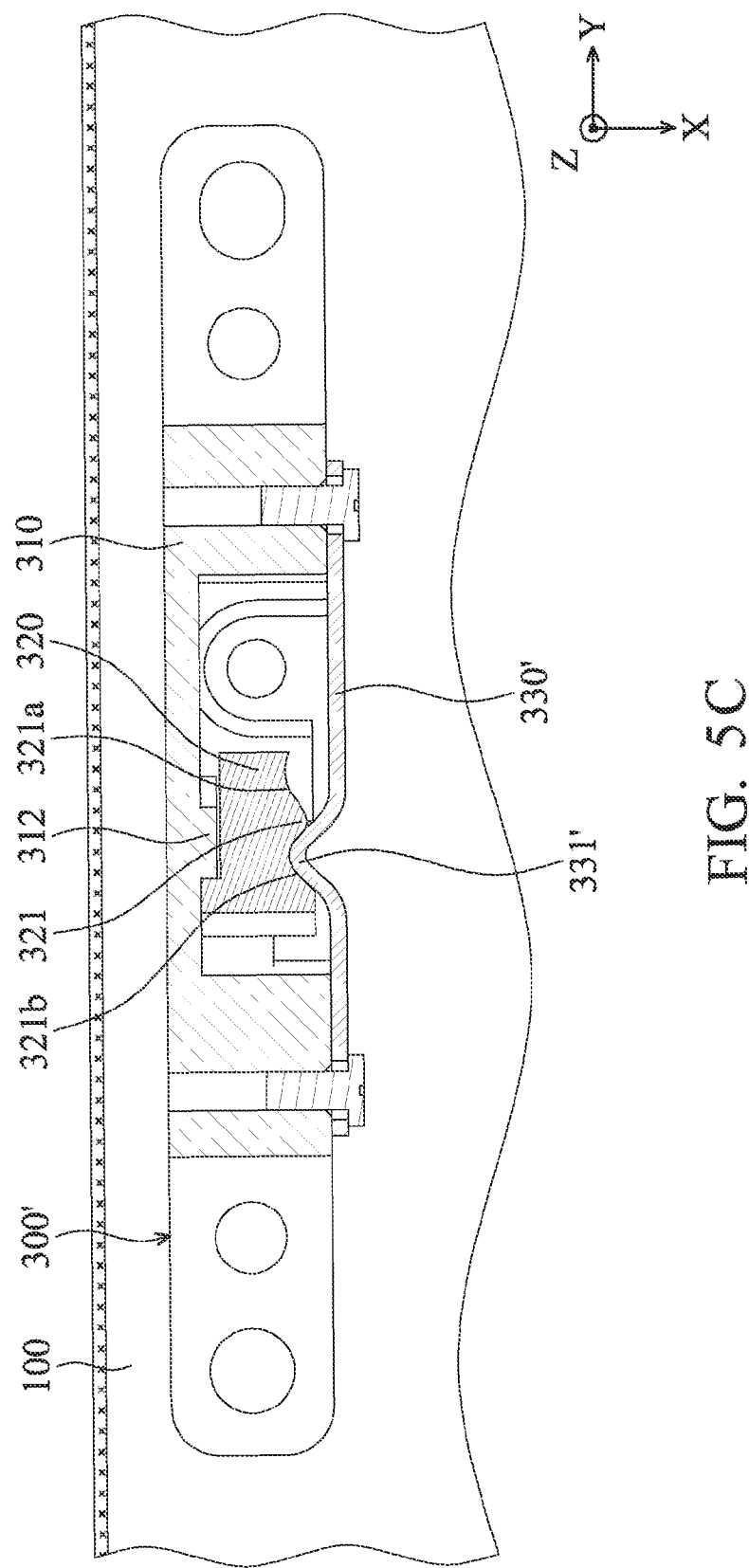
FIG. 5C is a cross-sectional view of an electronic device when the slider is in a second position according to an embodiment of the invention.

Referring to FIGS. 5A-5C, FIG. 5A shows an exploded diagram of a slide mechanism 300' according to another embodiment of the invention, wherein the elastic member 330' includes a protruding portion 331'. As shown in FIG. 5B, when the slider 320 is in the first position of the groove 311, the protruding portion 331' contacts the first recessed surface 321a on the right side of the first protrusion 321. The slider 320 is positioned in the first position, and the supporting member 200 is positioned in the receiving portion 120. As shown in FIG. 5C, when the slider 320 slides from the first position to the second position, the protruding portion 331' moves from the first recessed surface 321a and contacts the second recessed surface 321b on the left side of the first protrusion 321. Thus, the slider 320 can be positioned in the second position, and an angle formed between the supporting member 200 and the housing 100 can be also maintained.

The fixed member 310 is fixed to the housing 100 in this embodiment for easy detachment and maintenance. However, the housing 100 and the fixed member 310 can also be integrally formed in one piece by molding in some embodiments. That is, the elements such as groove 311 and stopping portion 312 can be directly formed on the housing 100. Furthermore, the supporting member 200 and the slider 320 can also be integrally formed in one piece by molding.

In summary, an electronic device with slide mechanism is provided. The electronic device can be smaller and lighter by applying the groove and slider of the slide mechanism. Additionally, the supporting member can smoothly rotate relative to the housing, and easy maintenance of the electronic device can be also achieved.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a housing;
   a fixed member, fixed to the housing;
   a curved groove, formed on the fixed member;
   a slider, movably disposed in the groove and comprising a first recessed surface, a second recessed surface, and a first protrusion therebetween;
   a supporting member, connected to the slider;
   an elastic member, disposed on a side of the groove and comprising a recess; and
   an elastic ball, contacting the elastic member and accommodated in the recess;
   wherein when the slider moves from a first position to a second position of the groove, the slider protrudes from the housing for supporting the housing, and an angle is formed between the supporting member and the housing, wherein when the slider is in the first position, the first recessed surface contacts the elastic ball, and when the slider is in the second position, the second recessed surface contacts the elastic ball.

2. The electronic device as claimed in claim 1, wherein the fixed member comprises a depression with the elastic ball accommodated therein.

3. The electronic device as claimed in claim 1, wherein the slider comprises a second protrusion, and the fixed member comprises a stopping portion, wherein when the slider moves from a first position to a second position, the second protrusion contacts the stopping portion, and the slider is restricted in the second position.

4. The electronic device as claimed in claim 1, wherein when the slider is in the first position, the supporting member is aligned with an outer surface of the housing.

5. The electronic device as claimed in claim 1, wherein the fixed member and the housing are integrally formed in one piece by molding.

6. The electronic device as claimed in claim 1, wherein the electronic device is a tablet computer.

* * * * *